(12) United States Patent
Chung

(10) Patent No.: US 7,564,811 B2
(45) Date of Patent: Jul. 21, 2009

(54) METHOD AND APPARATUS FOR MINIMIZING HAND-OFF TIME USING MOBILE NODE INFORMATION

(75) Inventor: Woon-jae Chung, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 361 days.

(21) Appl. No.: 11/333,415

(22) Filed: Jan. 18, 2006

(65) Prior Publication Data

US 2006/0159049 A1    Jul. 20, 2006

(30) Foreign Application Priority Data

Jan. 18, 2005    (KR)    ........................ 10-2005-0004620

(51) Int. Cl.
*H04Q 7/00*    (2006.01)
*H04Q 7/20*    (2006.01)

(52) U.S. Cl. .................. 370/328; 370/310; 370/310.2; 370/338; 370/331; 370/400; 455/432.1; 455/436; 455/445; 455/432.3

(58) Field of Classification Search .............. 370/331, 370/310, 310.2, 328, 338; 455/432.1, 436, 455/442, 422.1
See application file for complete search history.

(56) References Cited

U.S. PATENT DOCUMENTS

| | | | | |
|---|---|---|---|---|
| 6,473,413 B1* | 10/2002 | Chiou et al. | ................. | 370/331 |
| 6,697,468 B2* | 2/2004 | Wong et al. | ............ | 379/112.01 |
| 6,763,007 B1* | 7/2004 | La Porta et al. | ............. | 370/331 |
| 6,771,635 B1* | 8/2004 | Vilander et al. | ............. | 370/349 |
| 7,324,492 B2* | 1/2008 | Leung et al. | ................. | 370/338 |
| 2002/0191561 A1* | 12/2002 | Chen et al. | ................... | 370/331 |
| 2003/0087646 A1 | 5/2003 | Funato et al. | | |
| 2003/0154293 A1* | 8/2003 | Zmolek | ...................... | 709/228 |
| 2003/0161332 A1* | 8/2003 | Ohno et al. | ................. | 370/401 |
| 2005/0265360 A1* | 12/2005 | Kim et al. | ................... | 370/400 |
| 2006/0176847 A1* | 8/2006 | Chen et al. | ................... | 370/328 |
| 2006/0209773 A1* | 9/2006 | Hundal et al. | ................ | 370/338 |

FOREIGN PATENT DOCUMENTS

| | | |
|---|---|---|
| EP | 1 014 628 A1 | 6/2000 |
| EP | 1 473 900 A2 | 11/2004 |
| JP | 1013910 A | 1/1998 |
| JP | 2004-007072 A | 1/2004 |

(Continued)

OTHER PUBLICATIONS

James D. Solomon, Mobile IP: The Internet Unplugged, Jul. 27, 1998, pp. 291-321, Japan.

(Continued)

*Primary Examiner*—Huy Q Phan
(74) *Attorney, Agent, or Firm*—Sughrue Mion, PLLC (57) ABSTRACT

A method and apparatus for minimizing hand-off time using mobile node information. In the method of minimizing hand-off time using mobile node information, identification information is received that includes information about a router and unique information about an access point. Information about a mobile node connected to a network, which is controlled by the access point, is combined with the identification information, thus generating a mobile IP address of the mobile node. The mobile IP address is then transmitted to the mobile node.

23 Claims, 7 Drawing Sheets

FOREIGN PATENT DOCUMENTS

| | | |
|---|---|---|
| JP | 2004-007073 A | 1/2004 |
| JP | 2004-48335 A | 2/2004 |
| JP | 2004282172 | 10/2004 |
| KR | 10-2002-0023918 A | 3/2002 |
| KR | 10-2003-0088724 A | 11/2003 |
| KR | 10-2003-0088727 A | 11/2003 |
| WO | 2005/008994 A1 | 1/2005 |

OTHER PUBLICATIONS

Hong et al., "Access Router Based Fast Handover for Mobile IPv6", Advanced Communication Technology, 2004, The 6th International Conference on Phoenix Park, Korea Feb. 9-11, 2004, pp. 129-132, vol. 1, IEEE.

* cited by examiner

METHOD AND APPARATUS FOR MINIMIZING HAND-OFF TIME USING MOBILE NODE INFORMATION

CROSS-REFERENCE TO RELATED APPLICATION

This application claims priority from Korean Patent Application No. 10-2005-0004620 and filed on Jan. 18, 2005 in the Korean Intellectual Property Office, the disclosure of which is incorporated herein by reference in its entirety.

BACKGROUND OF THE INVENTION

1. Technical Field

Apparatuses and methods consistent with the present invention relate to minimizing hand-off time using mobile node information.

2. Related Art

As wired networking shifts to wireless networking, research on the dynamic combination of network devices is being conducted. A related art mobile Internet Protocol (IP) is an IP address provided to a mobile node.

Figure 1:
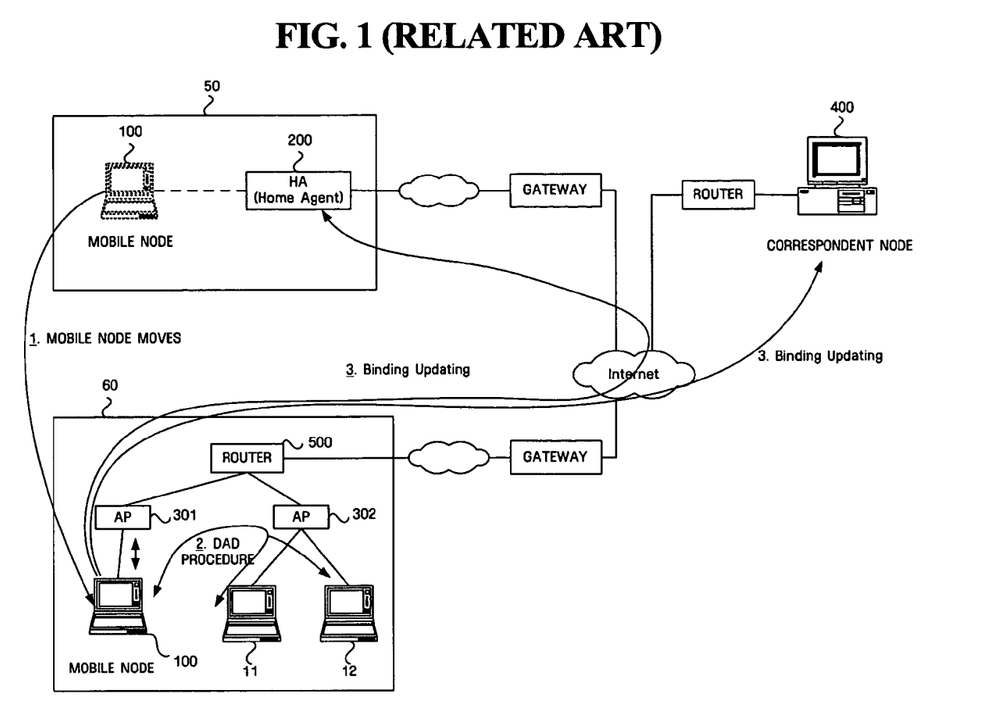
FIG. 1 is a diagram showing an example of a related art process of assigning a mobile IP.

FIG. 1 is a diagram showing an example of a related art process of assigning a mobile IP. A mobile node 100 moves to a foreign network 60 while communicating with a correspondent node 400 in a home domain 50 through a home agent 200. The mobile node 100 requests an L2 connection from an Access Point (AP) 301 in the foreign network 60. The AP 301 provides a response to the L2 connection request (as illustrated FIG. 2 and its accompanying disclosure) to the mobile node 100. Further, the movement of the mobile node 100 is detected through an advertisement message (a router advertisement), which is periodically transmitted by a router 500 or the AP 301. The mobile node generates a care-of address using the router advertisement. A Duplicate Address Detection (DAD) procedure starts to determine whether the care-of address is unique.

The DAD procedure is executed by transmitting a care-of address to another host or another node in a corresponding domain and determining whether a device using the same address as the care-of address exists. If a message indicating that the corresponding care-of address being used is received from the other device within a predetermined period of time (related art standards recommend 1 sec.), another care-of address is selected, and then a DAD procedure is re-executed. If a message, indicating that the corresponding care-of address being used is not received within the predetermined period of time, it is determined that the generated care-of address is unique and it is used. The mobile node 100 accordingly executes a Binding Update (BU) procedure to notify the home agent 200 and the correspondent node 400 that the IP of the mobile node 100 has changed.

Figure 2:
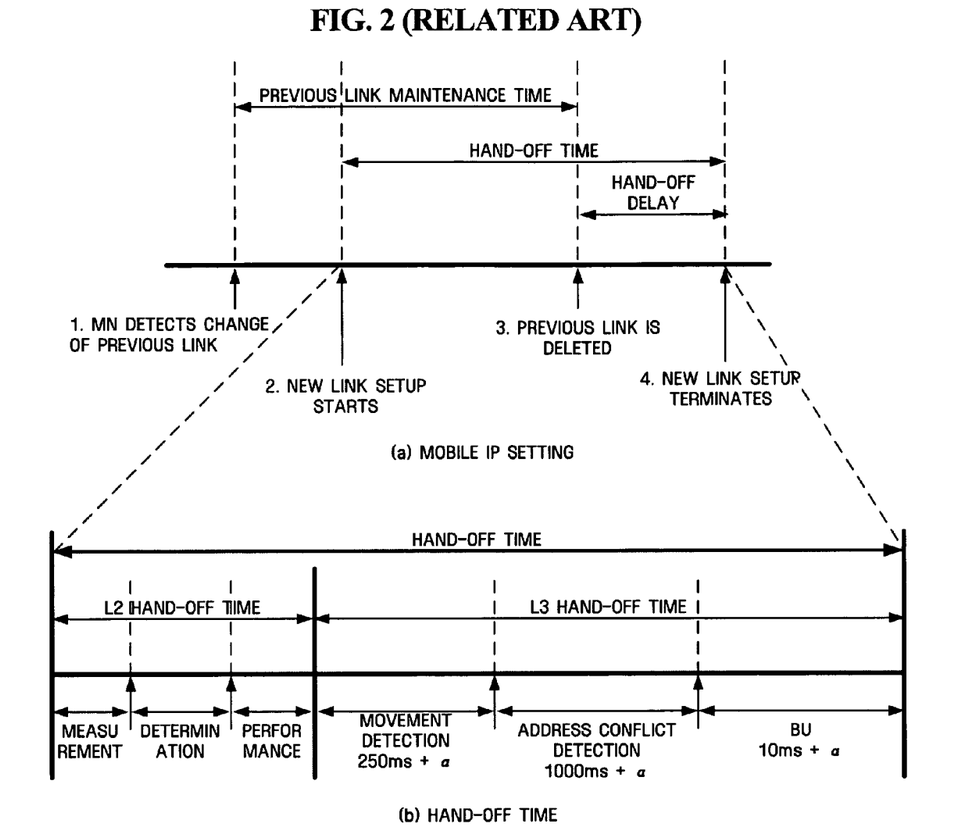
FIG. 2 is a chart showing the time occupied by a hand-off delay in a related art mobile IP.

FIG. 2 shows charts in which the time occupied by a hand-off delay time in a related art mobile IP is shown.

FIG. 2 includes a chart (a) showing the time from the point at which a mobile node leaves a previous link to the point at which the mobile node completes setup of a new link. In operation 1, a mobile node (MN) senses that it is starting to leave a previous link. Therefore, the setup of a new link starts in operation 2; from this time, hand-off starts. Further, if the setup of the new link is terminated in operation 4 after the previous link is deleted in operation 3, hand-off is completed. During a period starting from the point at which the previous link is deleted to the point at which the setup of the new link is terminated (i.e., the handoff delay), communication is not performed, and it is important to reduce such a period.

FIG. 2 also includes a chart (b) showing the hand-off time subdivided. The hand-off time is divided into L2 hand-off time and L3 hand-off time. The L2 hand-off time denotes the time for which hand-off in a Medium Access Control (MAC) Layer is performed; the L2 hand-off time is composed of periods for the operations of measuring a link, determining whether the link has changed, and performing hand-off if the link has changed.

The L3 hand-off time includes hand-off in a network layer, and it is composed of a movement detection period, an address conflict detection period and a Binding Update (BU) period. In order to detect movement, a period above 250 ms is required according to related art mobile IP related standards. If the period required for movement detection is short, there is an advantage in that movement can be promptly detected, but there is a disadvantage in that the burden on a router increases.

Address conflict detection period means the time required for the performance of the above-described DAD. If the DAD performance time is short, the hand-off time can be shortened. However, because the time required to detect a duplicate address is shortened, a minimum time of about 1000 ms is required by the standards. For the BU operation of indicating a changed address after the detection of an address conflict has terminated, about 10 ms is required.

In the case of typical voice data, if the hand-off time exceeds 150 ms, a user can detect the stoppage of service. Further, in the case of an application program more sensitive to time than voice data, if the hand-off is not processed within about 100 ms, service quality may deteriorate.

The L2 hand-off time is several tens of ms, but the L3 hand-off time requires about 1300 ms when the period recommended by the related art standards is obeyed, and this occupies most of the hand-off time. Therefore, there is a need to improve the performance of mobile IP is to minimize the hand-off time. In particular, a method and apparatus for reducing the address conflict detection period that occupies most of the L3 hand-off time are required.

SUMMARY OF THE INVENTION

The present invention provides a method and apparatus for minimizing hand-off time of a mobile node that uses a mobile IP address, through the use of information about the mobile node.

The present invention also provides a method and apparatus for minimizing hand-off time and improving communication quality at the time of movement by minimizing the hand-off time.

According to an aspect of the present invention, there is provided a method of minimizing hand-off time using mobile node information, comprising receiving identification information, including information about a router and unique information about an access point, combining information about a mobile node connected to a network, which is controlled by the access point, with the identification information, thus generating a mobile IP address of the mobile node, and transmitting the mobile IP address to the mobile node.

In accordance with another aspect of the present invention, there is provided an access point for minimizing hand-off time using mobile node information, comprising a prefix reception unit for receiving identification information, including information about a router and unique information about the access point, an address generation unit for combining information about a mobile node connected to a network, which is controlled by the access point, with the identification information, thus generating a mobile IP address of the mobile node, and an address transmission unit for transmitting the mobile IP address to the mobile node.

BRIEF DESCRIPTION OF THE DRAWINGS

The above and other aspects of the present invention will be more apparent from the following detailed description of exemplary embodiments taken in conjunction with the accompanying drawings, in which.

DETAILED DESCRIPTION OF THE INVENTION

Before the description, the meaning of terms used in the specification is described in brief. However, it should be noted that the description of the terms is used to help in the understanding of the present specification and the terms are not intended to limit the technical spirit of the present invention when the terms are not described as items definitely limiting the present invention.

Mobile IP

Mobile IP is a technology that applies the Internet Protocol (IP) to a mobile node. If an address obtained in a current network is registered in a Home Agent (HA) when a mobile node accesses a remote network from an external location, a home network transmits data to a node of the remote network. In order to reduce the complexity of managing IP addresses when a post frequently moves or when the number of mobile workers is large, the Internet Engineering Task Force (IETF) proposed Mobile IP in Request For Comments (RFC) 2002. These mobile IP standards are composed of two parts, mobile IP agents and mobile nodes. Each mobile IP agent is in charge of a virtual routing service for routing packets to a registered mobile node. Mobile IP allows two IP addresses for each mobile node. One IP address is used for identification, and the other is used for routing.

Mobile Node (MN)

A mobile node is a device that changes from one network to another network. When the mobile node leaves a home network and moves to a foreign network, the mobile node is assigned an IP address through the new link, thus maintaining communication. The mobile node could be a mobile phone, a notebook computer, a Personal Digital Assistant (PDA), or a Voice over Internet Protocol (VoIP) phone. However, the foregoing devices are merely provided as examples, and the exemplary embodiment is not limited thereto, as other mobile nodes as would be known by one of ordinary skill in the art could be provided.

Home Agent and Home Address

A home agent is a router for transmitting data when a mobile node leaves a home network (original network). A home address is an address for identifying a mobile node.

Foreign Agent

A foreign agent is a router for providing a routing service to a foreign node newly connected to a mobile node.

Care-of Address (CoA)

A care-of address is an IP address that a mobile node possesses when it moves from a home network to a foreign network. A mobile node randomly generates a care-of address, transmits the care-of address to a network newly connected to by the mobile node, and determines whether other devices having the same care-of address exist. A related art method requires a procedure for determining whether a duplicate address exists during a hand-off process.

Correspondent Node

A correspondent node is a node with which a moving mobile node is communicating. The correspondent node may be a mobile node or a stationary node.

Access Point (AP)

An access point (AP) is a device for managing a wireless network. One router may be connected to a plurality of access points. Each access point transmits network information, transmitted by the router, to a mobile node, and performs a procedure required for binding a mobile node to a network.

After the mobile node generates a care-of address, substantial time is required to determine whether other hosts exist that use the care-of address; as such, it is necessary to reduce the time required for the Duplicate Address Detection (DAD) procedure. Since DAD is necessary for guaranteeing the uniqueness of an address, a DAD procedure is not necessary when an address is generated in a manner that guarantees its uniqueness.

A network card attached to a network device has an MAC address. Originally, it was recommended that an MAC address be generated in a manner that guarantees its uniqueness. However, in an actual network, it cannot be assumed that an MAC address is unique, because first, an MAC address can be arbitrarily changed through software or a dip switch in some nodes or systems, and second, an MAC address is composed of a 24-bit manufacturing company identifier and a 24-bit node identifier, so that the number that can be used to identify a node is limited to 24 bits.

However, MAC addresses are systematic in that they guarantee at least a baseline level of uniqueness, and are grouped and generated according to a manufacturing company or product. Therefore, in an exemplary embodiment, of the information in a mobile node, information that guarantees uniqueness to at least a baseline, such as an MAC address, is selected, and the selected information is used as part of a care-of address, thus allowing the mobile node to generate the care-of address without a DAD procedure.

In the present specification, an exemplary embodiment in which uniqueness is guaranteed to at least a baseline level using the MAC address of a mobile node is presented. However, the present invention is not limited to this exemplary embodiment, other embodiments as would be understood by one of ordinary skill in the art are included. For example, but not by way of limitation, a care-of address may be generated using only a part of the MAC address.

Figure 3:
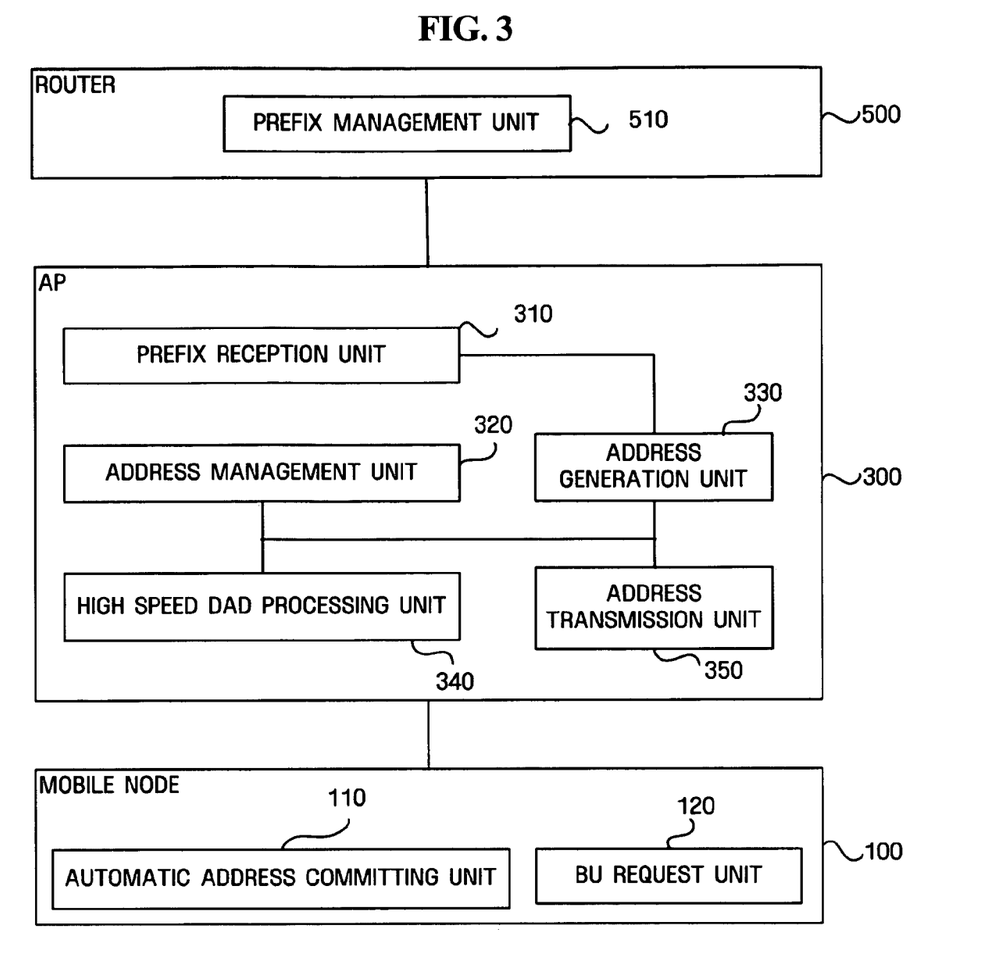
FIG. 3 is a block diagram showing the construction of a router, an AP and a mobile node according to an exemplary embodiment.

FIG. 3 is a block diagram showing the construction of a router, an AP and a mobile node according to an exemplary embodiment.

Terms including "unit", used in the exemplary embodiment, i.e., "module" or "table", denote software components, or hardware components, such as a Field-Programmable Gate Array (FPGA) or Application Specific Integrated Circuit (ASIC). Each module executes certain functions, and can be implemented to reside in an addressable storage medium, or to run on one or more processors. Therefore, as an example, a module may include various components, such as software components, object-oriented software components, class components and task components, processes, functions, attributes, procedures, sub-routines, segments of program code, drivers, firmware, microcode, circuits, data, databases, data structures, tables, arrays and variables. The functions provided by the components and modules can be combined into a small number of components and modules, or can be separated into additional components or modules. Moreover, components and modules can be implemented to drive one or more Central Processing Units (CPUs) in a device or secure multimedia card.

The construction of the mobile node 100, the AP 300 and the router 500 is shown in FIG. 3. The mobile node 100 includes an automatic address committing unit 110 for requesting a care-of address, and a BU request unit 120. The automatic address committing unit 110 requests a care-of address from the AP 300 to provide the mobile node 100 with a care-of address. In this case, the automatic address committing unit 110 transmits the MAC address of the mobile node 100 to eliminate the need for a DAD procedure. Further, if the AP 300 determines that the care-of address is a duplicate based on the MAC address, and indicates that the care-of address is not a duplicate, the BU requesting unit 120 performs an operation to notify a Home Agent (HA) and a Correspondent Node (CN) of its changed care-of address.

The AP 300 includes a prefix reception unit 310, an address management unit 320, an address generation unit 330, a high speed DAD processing unit 340 and an address transmission unit 350.

The prefix reception unit 310 receives a prefix assigned to each AP from the router 500, and stores the prefix. A unique prefix is assigned to each AP constituting the router. This prefix may be combined with an MAC address to generate the care-of addresses of other mobile nodes that will be connected later to the AP 300. The address management unit 320 stores information about mobile nodes connected to the AP 300, thus enabling a unique address to be generated. The address management unit 320 stores information that guarantees uniqueness to at least a baseline level, such as an MAC address, of information in the mobile nodes. If the MAC addresses of the mobile nodes are managed, whether a duplicate MAC address exists can be easily determined. The construction of the address management unit 320 will be described below.

If it is determined by the address management unit 320 that duplicate information does not exist, for example but not by way of limitation, a duplicate MAC address does not exist, the address generation unit 330 receives both a prefix to be used as part of an address from the prefix reception unit 310 and an MAC address from the address management unit 320, and generates a care-of address. If a device having the same MAC address exists, the high speed DAD processing unit 340 determines whether a new address that has been generated and transmitted by the mobile node 100 is a duplicate. As in the related art method, the DAD function is performed. The address transmission unit 350 transmits the address that has been generated by the address generation unit 330 to the mobile node 100. The address transmission unit 350 may include the mobile IP of the mobile node 100 in a router advertisement when transmitting the router advertisement. The router advertisement may include various pieces of information required for network management or binding, or data transmission, and it may be transmitted.

The router 500 includes a prefix management unit 510 for managing prefixes to be assigned to APs, which are managed by the router 500. Information about the prefixes may be included in a router advertisement that is periodically transmitted by the router. The prefix information must be unique information as it is used to identify APs. The prefix information includes subnet prefixes managed by the router.

Figure 4:
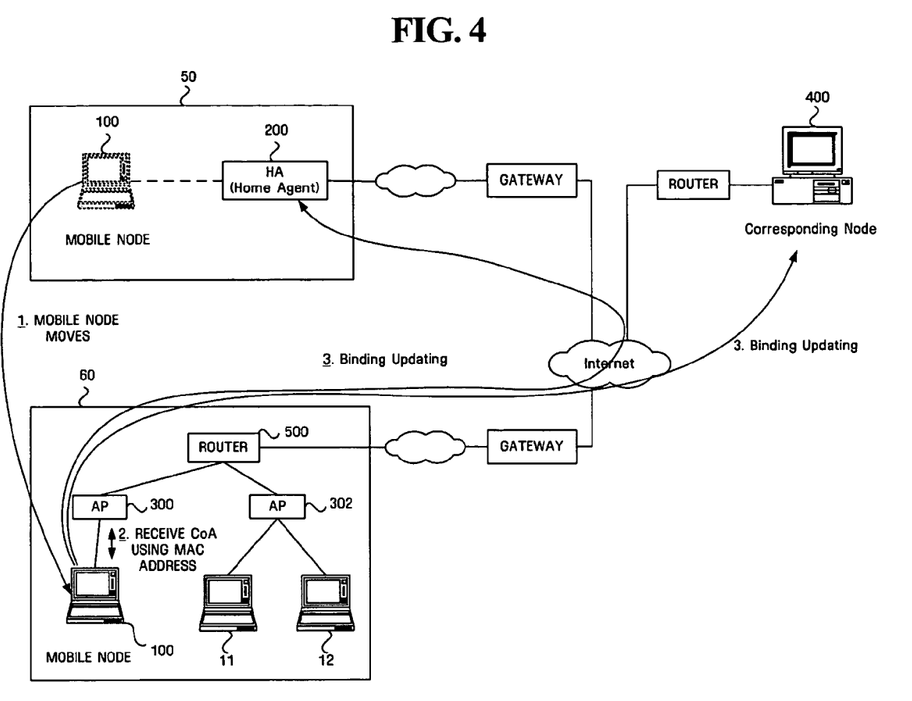
FIG. 4 is a diagram showing a process of setting a mobile IP according to an exemplary embodiment.

FIG. 4 is a diagram showing an exemplary process of setting a mobile IP. The IP setting procedure is described with reference to components described in FIG. 3.

The mobile node 100 leaves a home network 50 and connects to a foreign network 60 while communicating with a correspondent node 400 through a home agent 200. At that time, the AP 300, constituting the foreign network 60, caches prefix information that is included in a router advertisement transmitted by the router 500. The prefix information is generated by the router to prevent address conflict with another AP 302. The automatic address committing unit 110 of the mobile node 100 transmits the MAC address of the mobile node to the AP 300. Since the mobile node is newly connected to the network 60, the MAC address of the mobile node is stored in the address management unit 320.

The address management unit 320 of the AP 300 determines whether the MAC address already exists by referring to the received MAC address of the mobile node. If the MAC address does not exist, the address generation unit 330 generates a care-of address including both the prefix of the AP and the MAC address of the mobile node 100. Further, the address transmission unit 350 transmits the care-of address to the mobile node 100. Thereafter, the mobile node 100 performs a Binding Update (BU) to notify the home agent 200 and the correspondent node 400 of the care-of address through the BU request unit 120. The care-of address is transmitted through the Internet via the AP 300, the router 500 and a gateway.

Meanwhile, if the mobile node 100 leaves a domain including the network, the AP can delete the MAC address of the mobile node. If a corresponding MAC address is deleted when the mobile node releases connection, a mobile IP address can be acquired using the same MAC address when another mobile node having the MAC address is connected to the network.

It can be seen that the process of setting a mobile IP in FIG. 4 can substantially reduce the time required for entire hand-off by omitting the DAD procedure described in FIG. 1.

Referring to FIG. 2, an L3 hand-off time is 1260 ms+α when satisfying requirements recommended by the related art standards. However, as shown in the process of FIG. 4, the DAD procedure (i.e., address conflict detection which requires about 1000 ms+α) is omitted, so that the L3 hand-off time is about 260 ms+α. That is, it can be seen that the L3 hand-off time is reduced by about 80%.

Figure 5:
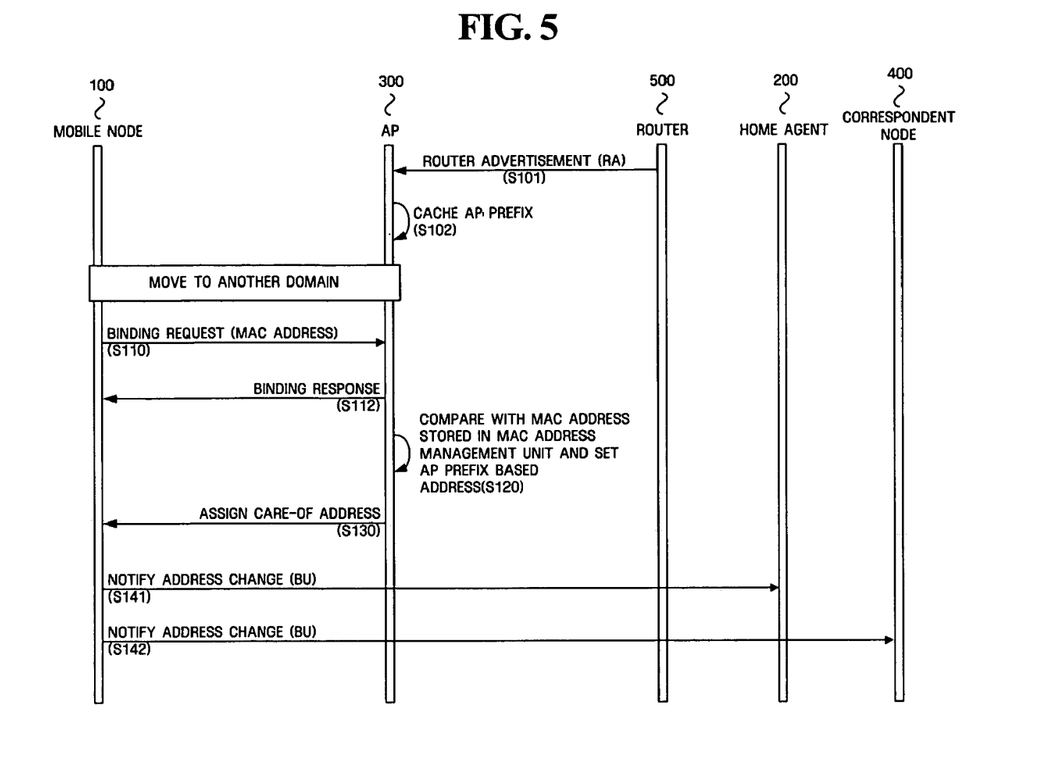
FIG. 5 is a sequence diagram showing a process of setting a mobile IP according to an exemplary embodiment.

FIG. 5 is a sequence diagram showing a process of setting a mobile IP according to an exemplary embodiment. The router 500, which manages a foreign network that the mobile node 100 connects to, periodically transmits a router advertisement to the AP 300 constituting the network operation S101. In this case, the router advertisement includes information about an AP prefix uniquely assigned to the AP 300. The AP 300 caches the prefix information included in the router advertisement in operation S102. Meanwhile, the mobile node 100 moves from its domain to a foreign domain. Further, the mobile node 100 requests binding from the AP 300, and transmits an MAC address with the request. The AP 300 transmits a response indicating that binding has succeeded in operation S112.

Further, the address management unit 320 of the AP 300 determines whether the MAC address transmitted by the mobile node 100 has been stored, and combines an address based on the AP prefix cached in operation S102 with the MAC address to generate a care-of address if the same MAC address is not stored in operation S120. The generated address is assigned to the mobile node in operation S130. The assignment of the mobile IP address is performed by including the mobile IP address in a router advertisement, and transmitting the router advertisement with the mobile IP address.

The mobile node performs a Binding Update (BU) operation to notify the home agent 200 and the correspondent node 400 of its care-of address in operation S141 and S142.

Figure 6:
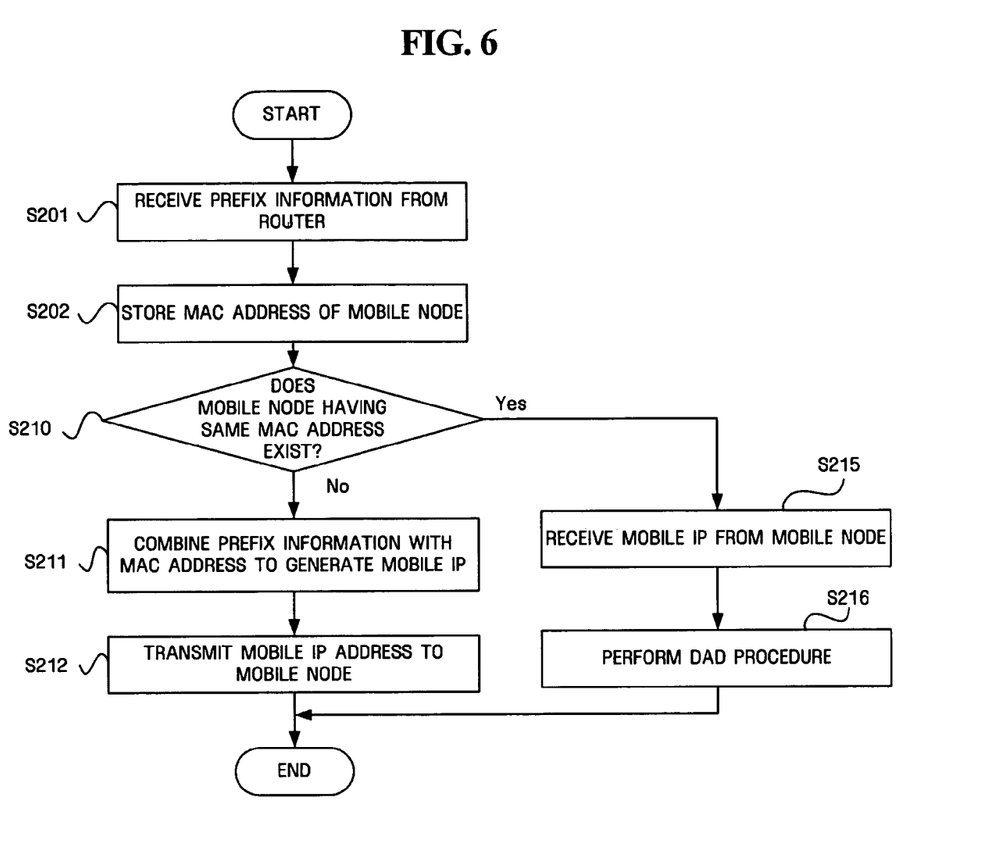
FIG. 6 is a flowchart of a process of an AP generating a mobile IP address using the MAC address of a mobile node according to an exemplary embodiment.

FIG. 6 is a flowchart showing a process of an AP generating a mobile IP address using the MAC address of a mobile node according to an exemplary embodiment.

Figure 7:
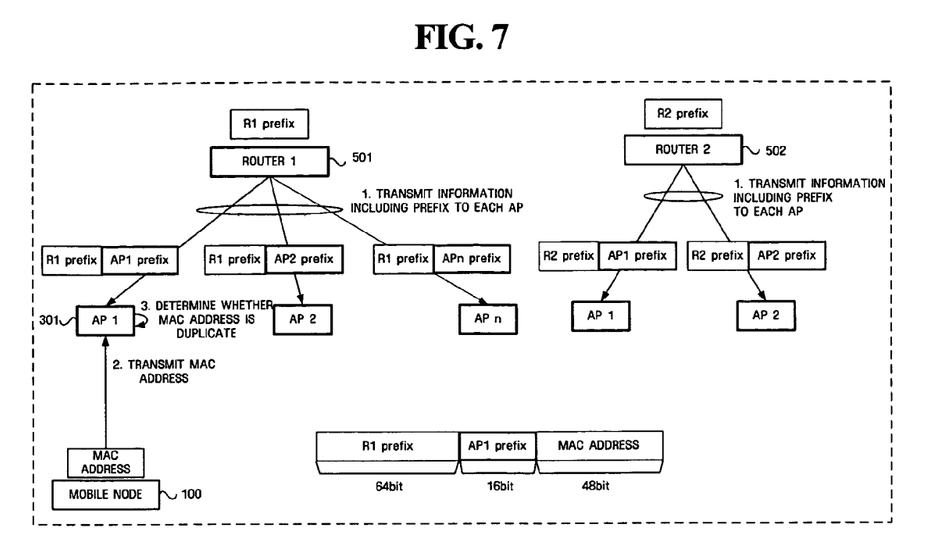
FIG. 7 is a diagram showing a process of combining the prefixes of a router and an AP with the MAC address of a mobile node according to an exemplary embodiment.

The AP receives prefix information from a router in operation S201. As an example of the prefix information, the prefix information includes a subnet prefix of the router and unique AP information, as shown in FIG. 7. However, the present invention is not limited thereto. A router advertisement, which is transmitted by the router, may include the prefix information. Further, the AP receives the MAC address of a mobile node, entering a wireless range of the AP and requesting binding, and stores the MAC address in operation S202. If other information, which satisfies uniqueness to a least a baseline level and can be transmitted by the mobile node, exists in addition to the MAC address, this information can be used.

The AP determines whether a mobile node having the same MAC address as the received MAC address exists in operation S210. As a result of the determination, if no mobile node having the same MAC address exists, the prefix information in operation 201 and the MAC address are combined, thus generating a mobile IP address in operation S211. Further, this address is transmitted to the mobile node in operation S212. This address can be included in the router advertisement transmitted by the AP.

Meanwhile, if a mobile node having the same MAC address exists, a related art DAD procedure is performed. Therefore, the AP receives a mobile IP, randomly generated by the mobile node, from the mobile node in operation S215. The AP transmits the received mobile IP address to another network through the router and determines whether another device having the same address exists in operation S216.

FIG. 7 is a diagram showing a process of combining the prefixes of a router and an AP with the MAC address of a mobile node according to an exemplary embodiment.

The mobile IP is based on Internet Protocol version 6 (IPv6) and is composed of a total of 128 bits. In a unicast address, the upper 64 bits of the 128 bits are used as a subnet prefix, and the lower 64 bits are used as an interface identifier. Therefore, a router 501 or 502 can transmit the identifiers of the router and each combined AP to each AP. This subnet prefix can vary depending on the address setting scheme of IPv6, which means that some of the 128 bits can be combined with the addresses of the router and the AP and transmitted. For example but not by way of limitation, if 64 bits are used as a subnet prefix, the upper 16 bits of the lower 64 bits are set to information used to identify an AP, and the remaining 48 bits are set to the MAC address of the mobile node.

The router 501 or 502 transmits a router advertisement to each AP constituting the network. This router advertisement includes a prefix identifier of each AP. Further, the router advertisement may include the prefix of the router. The prefix for each AP is stored in the prefix reception unit of the AP.

Meanwhile, if the mobile node 100 requests binding from the AP 301 and transmits an MAC address, the AP 301 determines whether the corresponding MAC address is a duplicate, and transmits a mobile IP address, in which the MAC address is combined with the prefixes of the router and the AP, to the mobile node 100 when the corresponding MAC address is not a duplicate.

Figure 8:
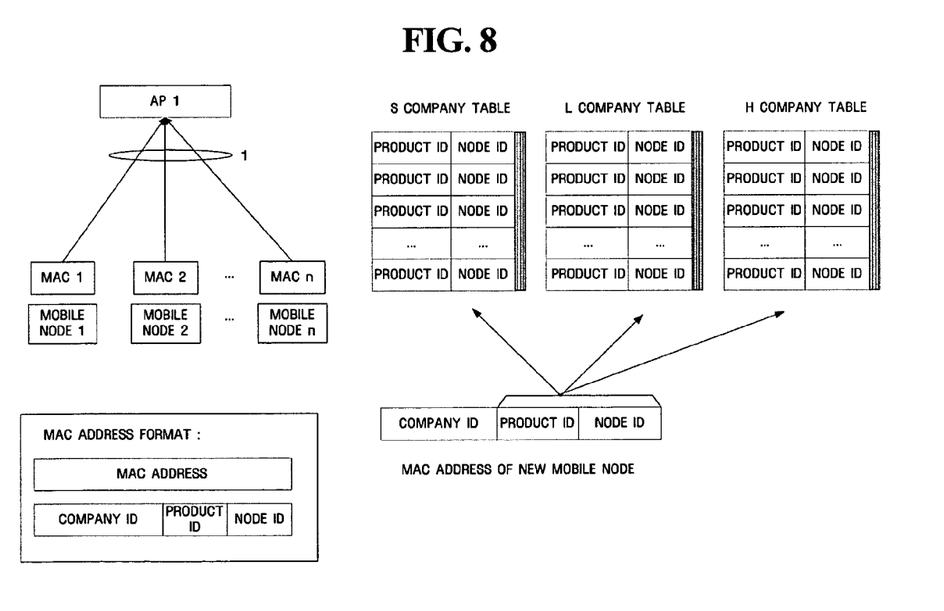
FIG. 8 is a diagram showing a scheme of an address management unit for managing an MAC address according to an exemplary embodiment.

FIG. 8 is a diagram showing a scheme of an address management unit managing an MAC address according to an exemplary embodiment. AN MAC address is composed of 48 bits. The MAC address is mainly divided into three parts, that is, a company ID used to identify a manufacturing company, a product ID used to identify a product, and a node ID assigned to each node. The product ID is used to identify a fax machine, computer or PDA with respect to a corresponding product. Therefore, in an exemplary embodiment of the address management unit of FIG. 8, the MAC addresses of mobile nodes are stored with respect to each company to reduce the time required for the comparison of the MAC addresses. For example but not by way of limitation, the MAC addresses of nodes of S company are stored in such a way that only product IDs and node IDs are stored in an S company table. The company IDs of the nodes identify S company so that there is no need to store the company IDs. In the case of L company and H company, the MAC addresses of mobile nodes are stored with respect to each company. If a new mobile node transmits an MAC address while managing the table for storing information in this way, tables for respective companies are searched depending on the manufacturing company of the new mobile node. Meanwhile, there is a high probability that the duplication of product IDs will occur, so that an MAC address is first searched for using a node ID at the time of searching for the MAC address, and the corresponding MAC address is used if the node ID is not a duplicate. If an MAC address, having the duplicate node ID, is detected when MAC addresses are searched for using a node ID, product IDs are compared to each other so that it can be determined whether the MAC address is a duplicate.

In order to increase the search speed, it is possible to examine only some lower bits of a node ID. Since the lower bits constitute an ID assigned to a node itself, there is a low probability that the ID is a duplicate. For example but not by way of limitation, if the lower 3 bits are first examined and differ from those of other node IDs, an entire MAC address differs from other MAC addresses so that there is no need to examine any other bits. If the lower 3 bits are the same, the entire node ID can be compared, or the entire product ID and the entire node ID can be compared to those of other MAC addresses.

The foregoing exemplary embodiment can be implemented in software, including a set of instructions stored in a computer-readable medium; however, the present invention is not limited thereto, as other implementations of software as would be understood by one of ordinary skill in the art may be used.

Accordingly, the exemplary embodiment is advantageous in that it can substantially minimize the hand-off time of a mobile node that uses a mobile IP address. Further, the exemplary embodiment can improve the communication quality without causing a communication interruption at hand-off.

Although the exemplary embodiments have been disclosed for illustrative purposes, those skilled in the art will appreciate that various modifications, additions and substitutions are possible without departing from the scope and spirit of the invention as disclosed in the accompanying claims. Therefore, it should be understood that the above exemplary embodiments are only exemplified in all aspects and are not restrictive. The scope of the present invention is defined by the attached claims rather than the detailed description. Those skilled in the art will appreciate that all modifications and substitutions derived from the meaning and scope of the claims and concept equivalent thereto are included in the scope of the present invention defined by the attached claims.

What is claimed is:

1. A method of performing a hand-off of a mobile node into a foreign network, the method comprising:
   receiving, at an access point of the foreign network, identification information from a router serving the access point, the identification information including information of the router and unique access point information assigned to the access point;
   receiving, at the access point, mobile node information about the mobile node entering the foreign network;
   combining the mobile node information, with the identification information to generate a mobile Internet Protocol (IP) address for the mobile node; and
   transmitting the mobile IP address to the mobile node.

2. The method according to claim 1, wherein the receiving comprises receiving a router advertisement that is periodically transmitted by the router.

3. The method according to claim 1, wherein the transmitting comprises transmitting a router advertisement, including the mobile IP address, to the mobile node.

4. The method according to claim 1, wherein the generating comprises determining whether a device having the substantially same information as the mobile node is connected to the access point.

5. The method according to claim 1, wherein the router information includes a subnet prefix of an IP address assigned by the router.

6. The method according to claim 1, wherein the unique access point information is distinguishable from unique information about other access points that comprise the router.

7. The method according to claim 1, wherein the mobile node information is a Medium Access Control address of the mobile node.

8. An access point of a foreign network for performing hand-off of a mobile node into the foreign network, the access point comprising:
   a prefix reception unit that receives identification information from a router serving the access point, the identification information including information of the router and unique access point information assigned to the access point;
   an address generation unit that combines mobile node information about the mobile node entering the foreign network at the access point, with the identification information, thus generating a mobile Internet Protocol (IP) address of the mobile node; and
   an address transmission unit that transmits the mobile IP address to the mobile node.

9. The access point according to claim 8, wherein the identification information is information included in a periodically transmittable router advertisement.

10. The access point according to claim 8, further comprising a router advertisement, including the mobile IP address, that is transmittable to the mobile node via the address transmission unit.

11. The access point according to claim 8, further comprising an address management unit that stores the mobile node information,
   wherein the address generation unit searches the address management unit to determine whether a device having substantially the same information as the mobile node is connected to the access point.

12. The access point according to claim 8, further comprising an address management unit that stores information about the mobile node with respect to each manufacturing company.

13. The access point according to claim 8, further comprising an address management unit that stores information about the mobile node with respect to each product.

14. The access point according to claim 8, wherein the information about the router includes a router-assigned subnet prefix of an IP address.

15. The access point according to claim 8, wherein the unique information about the access point can be distinguished from unique information about other access points constituting the router.

16. The access point according to claim 8, wherein the information about the mobile node is a Medium Access Control address of the mobile node.

17. A tangible computer readable medium storing a program for performing a hand-off method of a mobile node into a foreign network, the method comprising:
   receiving, at an access point of the foreign network, identification information from a router serving the access point, the identification information including information of the router and unique access point information assigned to the access point;
   receiving, at the access point, mobile node information about the mobile node entering the foreign network;
   combining the mobile node information, with the identification information to generate a mobile Internet Protocol (IP) address for the mobile node; and
   transmitting the mobile IP address to the mobile node.

18. The tangible computer readable medium of claim 17, wherein the receiving comprises receiving a router advertisement that is periodically transmitted by the router, and the transmitting comprises transmitting a router advertisement, including the mobile IP address, to the mobile node.

19. The tangible computer readable medium of claim 17, wherein the generating comprises determining whether a device having the substantially same information as the mobile node is connected to the access point.

20. The tangible computer readable medium of claim 19, wherein the generating comprises combining said router information with said mobile node information when said determining determines that said device has the substantially same information as the mobile node connected to the access point, or performing a duplicate address detection procedure when said determining determines that said device does not have the substantially same information as the mobile node connected to the access point.

21. The method according to claim 1, wherein lower 64 bits of the mobile IP address includes the mobile mode information and upper 64 bits of the mobile IP address includes the identification information.

22. The access point according to claim 8, wherein lower 64 bits of the mobile IP address includes the mobile mode information and upper 64 bits of the mobile IP address includes the identification information.

23. The tangible computer readable medium of claim 17, wherein lower 64 bits of the mobile IP address includes the mobile mode information and upper 64 bits of the mobile IP address includes the identification information.

* * * * *